United States Patent [19]

Carroll

[11] 4,015,808
[45] Apr. 5, 1977

[54] COMBINED LEVELING BRACKET AND SHOCK ABSORBER FOR CABINET

[75] Inventor: John P. Carroll, Islip, N.Y.
[73] Assignee: Living Walls Inc., New York, N.Y.
[22] Filed: Dec. 15, 1975
[21] Appl. No.: 641,047
[52] U.S. Cl. ............................. 248/188.4; 248/24
[51] Int. Cl.² .................. B65D 19/40; F16F 15/06
[58] Field of Search ............ 248/188.4, 188, 188.8, 248/188.9, 24, 119 R; 312/255, 256; 5/310

[56] References Cited

UNITED STATES PATENTS

| 2,699,567 | 1/1955 | Kramcsak | 248/24 UX |
| 2,784,930 | 3/1957 | Inernecke | 248/188 |
| 2,823,392 | 2/1958 | Barry | 5/310 |
| 2,938,759 | 5/1960 | Mutchnik | 248/188.4 X |
| 3,027,680 | 4/1962 | Gallagher | 248/188.4 |

Primary Examiner—J. Franklin Foss
Attorney, Agent, or Firm—Blum, Moscovitz, Friedman & Kaplan

[57] ABSTRACT

A combined leveling bracket and shock absorber for a cabinet is provided which comprises a base plate having a pair of upturned flanges through which the base plate is connected to interior sidewalls of a cabinet in which the bracket is mounted. A foot mounted on a threaded stem adjustably connects into the base plate. A rubber grommet is removably mounted on the threaded stem and is tightly secured against the bracket while the cabinet is in transit. As fastened against the bracket, the grommet provides a shock absorber effect which absorbs impacts during incidental droppage of the cabinet during transit. During installation of the cabinet the foot is threadably disconnected from the base plate and the rubber grommet is removed from the threaded stem. The stem is then rethreaded through the base plate until the foot is suitably adjusted to a desired height for level mounting of the cabinet on a floor or other like surface.

2 Claims, 4 Drawing Figures

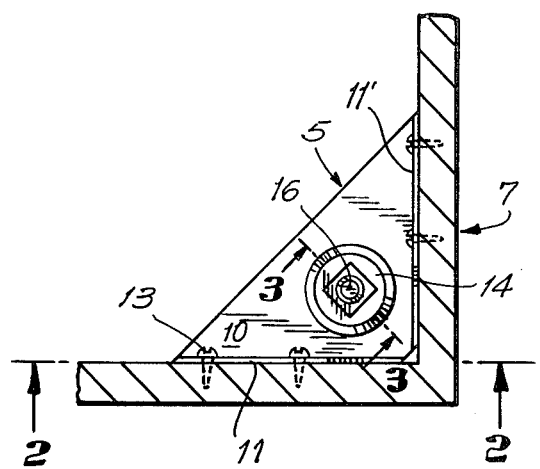
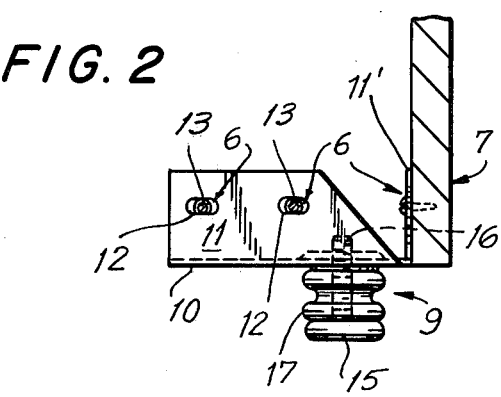
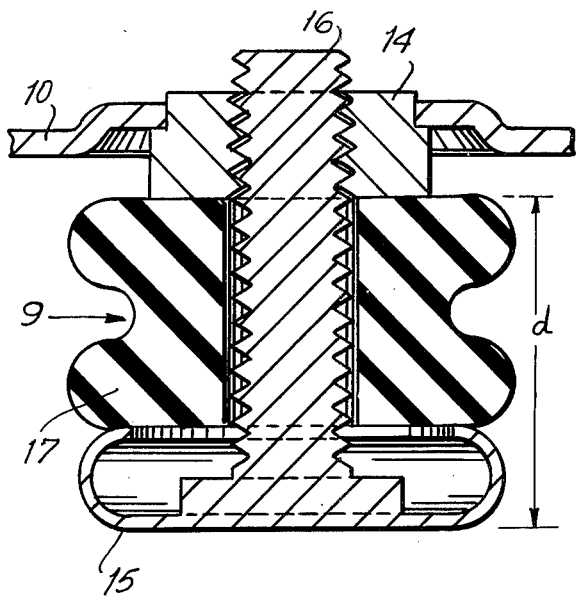
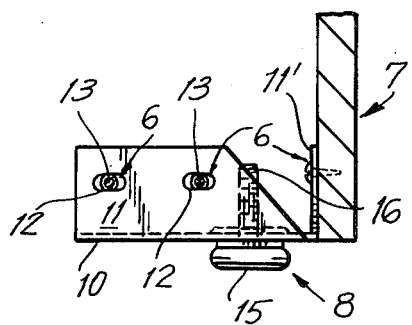

COMBINED LEVELING BRACKET AND SHOCK ABSORBER FOR CABINET

BACKGROUND OF THE INVENTION

This invention relates to a dual function device and more particularly to a combined leveling bracket and shock absorber for a cabinet.

It has been found that cabinet type furniture dropped during transit usually falls on a corner of the cabinet. Conventionally, leveling brackets are mounted in the corners of a cabinet base and these leveling brackets can take the brunt of impact of the furniture during a fall thereof. As a result of an impact to the leveling bracket, the leveling function thereof may be impaired and it may be difficult, if not impossible, to level the cabinet on a given surface. Furthermore, since the leveling bracket is usually screwed in during transit, an edge of a dropped cabinet will often strike the ground and irreparably damage the cabinet.

The instant invention provides means for absorbing an impact to the leveling bracket as well as the cabinet to which it is affixed so that neither is damaged.

SUMMARY OF THE INVENTION

Generally speaking, according to the invention, a combined leveling bracket and shock absorber for a cabinet is provided which comprises a base plate having a pair of upturned flanges arranged at substantially right angles to each other. The upturned flanges on the base plate include respective pairs of slots for connecting each flange to a respective interior sidewall of the cabinet in which the bracket is mounted. A foot mounted on a threaded stem adjustably connects into the base plate. A rubber grommet is removably mounted on the threaded stem and is tightly secured against the bracket while the cabinet is in transit. As fastened against the bracket, the grommet provides a shock absorber effect which absorbs impacts during incidental droppage of the cabinet during transit.

During installation of the cabinet the foot is threadably disconnected from the base plate and the rubber grommet is removed from the threaded stem. The stem is then rethreaded through the base plate until the foot is suitably adjusted to a desired height for level mounting of the cabinet on a floor or other like surface.

Accordingly, it is an object of this invention to provide a combined leveling bracket and shock absorber for a cabinet.

Another object of the invention is to provide a leveling bracket for a cabinet that may be adapted into a shock absorber, as desired, for impacting shocks to the cabinet during transit thereof.

A further object of the invention is to provide means for preventing damage to cabinet type furniture during transit thereof.

Still another object of the invention is to provide means for preventing damage to a leveling bracket installed in cabinet type furniture which is impacted during transit.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a top plan view of a device constructed in accordance with the instant invention, installed in a cabinet type piece of furniture;

FIG. 2 is a sectional view of the embodiment seen in FIG. 1, taken along line 2—2 thereof;

FIG. 3 is a sectional view of the embodiment seen in FIG. 1, taken along line 3—3 thereof; and FIG. 4 is a view of the embodiment seen in FIG. 2, the device having been adapted to perform its leveling function.

DETAILED DESCRIPTION OF THE INVENTION

Referring now to the drawings, the device includes a bracket generally designated by the numeral 5, a plurality of means 6 for installing bracket 5 in the corner of a cabinet generally designated 7, a means 8 for adjusting the height of cabinet 7 relative to flooring or a like planar surface, and a resilient means 17 for absorbing impacts to bracket 5 and cabinet 7 that may occur during transit of cabinet 7.

Bracket 5 includes a triangular base plate 10 having an area generally complementary to the generally perpendicularly oriented sidewalls of cabinet 7. Issuing from base plate 5 is a pair of upturned flanges 11 and 11' for installing base plate 10 in a corner of cabinet 7. Each of flanges 11 and 11' is provided with pairs of elongate slots 12,12 through which corresponding pairs of headed screws 13 may be introduced for interiorly connecting bracket 5 within a corner of cabinet 7.

An interiorly threaded clinch insert 14 is mounted in base plate 10. A foot 15 is mounted on one end of a threaded stem 16 having a thread which is complementary to the thread provided in clinch insert 14. According to one aspect of the invention the distance $d$ between clinch insert 14 and foot 15 may be axially adjusted by threading stem 16 into clinch insert 14 to a greater or lesser extent. As seen in FIG. 4, stem 16 has been threaded through clinch insert 14 until the upper surface of foot 15 abuts the corresponding lower surface of clinch insert 14. As assembled in the view seen in FIG. 4, bracket 5 levels cabinet 7 on a planar surface. If the surface is warped, the distance $d$ between foot 15 and clinch insert 14 may be adjusted to compensate for a depression in the surface on which cabinet 7 is mounted.

Prior to placing cabinet 7 in transit, stem 16 is threadably disconnected from clinch insert 14 and rubber grommet 17 provided with a bore complementary to the shape of stem 16 is mounted on stem 16. The length of rubber grommet 17 is less than the length of threaded stem 16. With rubber grommet 17 releasably mounted thereon, stem 16 is threaded into clinch insert 14 until rubber grommet 17 is compressed between foot 15 and clinch insert 14. As thus assembled, for instance as seen in FIGS. 2 and 3, the device functions as a shock absorber and impacts to bracket 5 that occur during transit of the cabinet are absorbed through rubber grommet 17. While grommet 17 has been characterized as fabricated of rubber, it is to be understood that grommet 17 may be fabricated of any resilient material that is not permanently deformable by a compressive force. Upon impact to bracket 5 during transit of cabinet 7 stress forces appear to concentrate in grommet 17 and bracket 5 does not undergo deformation. Also, play between threads of stem 16 and clinch insert 14 is provided so that shocks to foot 15 are not transferred to bracket 5 through stem 16. Therefore, an impact on the leveler does not deform bracket 5.

When cabinet 7 is delivered to its destination, grommet 17 may be removed from stem 16 and foot 15 may be adjusted in clinch insert 14 until the cabinet is leveled, as heretofore described. Grommet 17 may be retained and it may be reused when cabinet 7 is shipped again. It is of course understood that the number of brackets installed in each cabinet will vary according to the geometry of each cabinet base.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A device for leveling an installed cabinet and for absorbing impacts to the cabinet during transit thereof comprising a base plate, means for mounting said base plate in said cabinet, means defining a threaded bore in said base plate, a threaded stem having opposed ends, said stem being threadable through said threaded bore means, a foot mounted on one end of said threaded stem, said foot being constrained from moving along the longitudinal axis of said threaded stem, said threaded stem being threaded along the entire portion between said foot and said other end, a resilient grommet having a bore therein, said grommet being removably mounted on said threaded stem, said grommet being resiliently compressable between said foot and said base plate, and said device being substantially rigid when said grommet is removed from said threaded stem.

2. The device as claimed in claim 1 wherein said device further includes play between said threaded stem and said threaded bore means.

* * * * *